March 31, 1931.  O. B. WRIGHT  1,798,293
VALVE
Filed Oct. 9, 1929
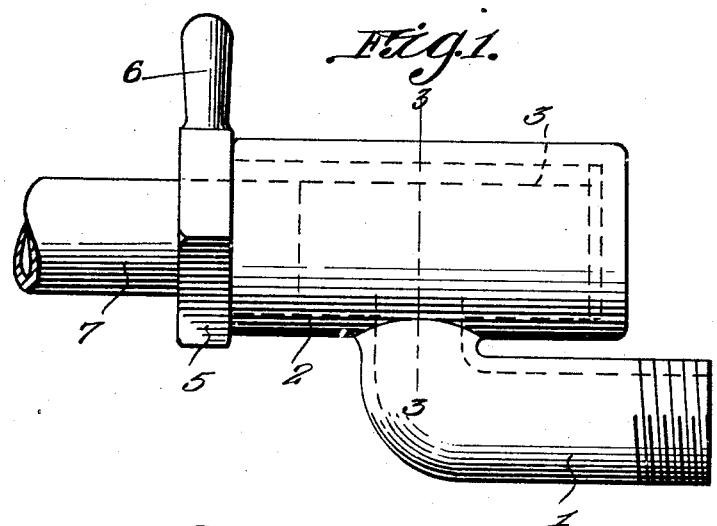
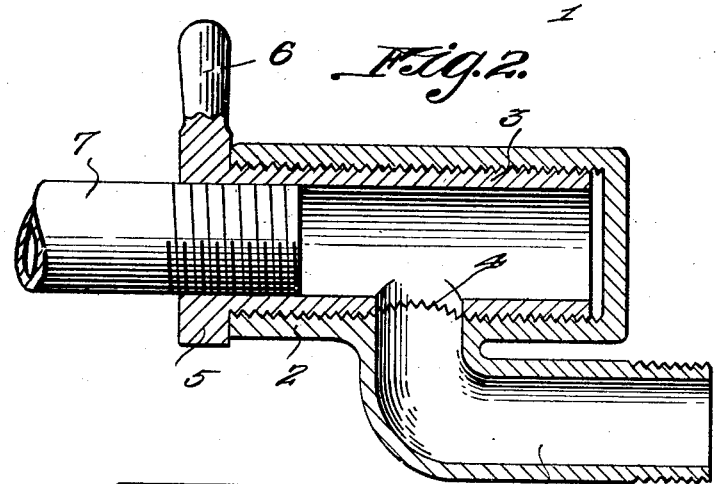
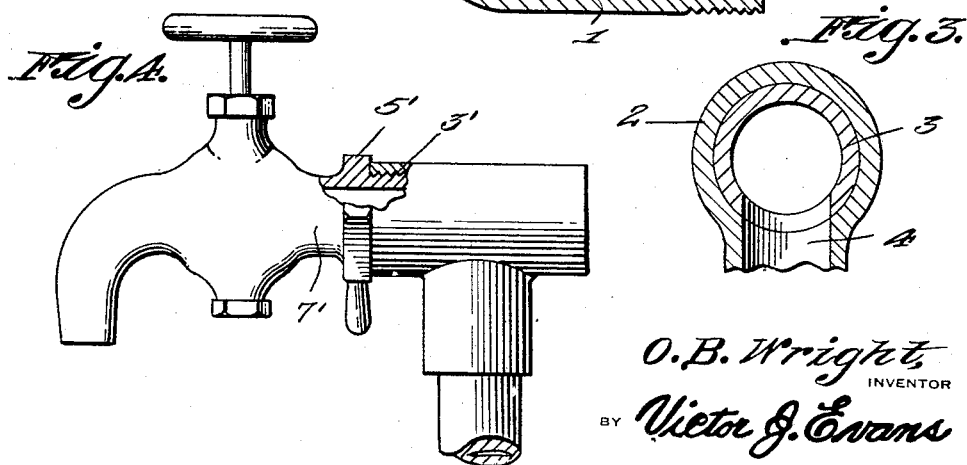
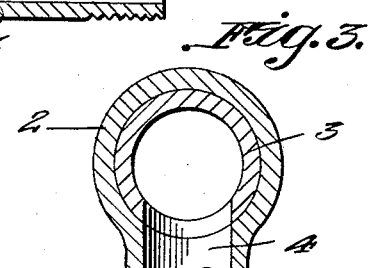
O. B. Wright,
INVENTOR
BY Victor J. Evans
ATTORNEY Patented Mar. 31, 1931

1,798,293

UNITED STATES PATENT OFFICE

ORION B. WRIGHT, OF MIAMI, ARIZONA, ASSIGNOR OF ONE-HALF TO AGUESTIN DOMENIZIAN, OF MIAMI, ARIZONA

VALVE

Application filed October 9, 1929. Serial No. 398,445.

This invention relates to a shut-off valve for a water system, the general object of the invention being to provide means whereby the line carrying the faucet can be easily and quickly closed to permit repair or renewal of a faucet without shutting off the water to other parts of the system.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation showing one form of the invention.

Figure 2 is a sectional view through Figure 1.

Figure 3 is a section on line 3—3 of Figure 1.

Figure 4 is an elevation, with parts in section, showing another form of the invention.

In these views, the numeral 1 indicates a part of the water line of the system and 2 indicates a cylinder which is connected with the outlet of the line. One end of this cylinder is closed and the other is open and the interior of the cylinder is threaded. The externally threaded sleeve 3 is threaded in the cylinder and has an opening 4 therein which, in one position of the sleeve, will register with the bore of the part 1, as shown in Figure 2, but when the sleeve is turned, the opening 4 will be out of alignment with the bore and thus the water is shut off from the cylinder.

A head 5 is formed on the outer end of the sleeve which abuts the open end of the cylinder and said head has a handle 6 thereon for enabling the sleeve to be turned. A portion of the faucet 7 is threaded in the sleeve or this part 7 may be a pipe to which the faucet is connected.

In the modification shown in Figure 4, the faucet 7' is formed integral with the head 5' of the sleeve 3', but in other respects, this form of the invention is similar to that before described.

From the foregoing it will be seen that when it is necessary to make repairs to the faucet and it is necessary to shut off the water to the faucet, the sleeve is turned by its handle 6 so as to place the hole 4 out of alignment with the bore of the pipe 1 so that water cannot enter the sleeve and thus repairs can be made to the faucet without shutting off the water to other parts of the building.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a water system including a supply pipe and a faucet, a cylinder having a side opening in communication with the supply pipe and having one end open, a sleeve threaded in the cylinder and extending through the open end thereof, a handle on the extended part, a faucet connected with and in communication with the sleeve and said sleeve having a hole therein which will register with the side opening in the cylinder when the sleeve is in one position and will be out of register with said bore when the sleeve is in another position.

In testimony whereof, I affix my signature.

ORION B. WRIGHT.